United States Patent Office 3,823,191
Patented July 9, 1974

3,823,191
TETRAKIS (3-MERCAPTOPROPYL) ETHER OF PENTAERYTHRITOL, $C(CH_2OCH_2CH_2CH_2SH)_4$
Shrikant V. Dighe, Silver Spring, Md., assignor to
W. R. Grace Co.
No Drawing. Continuation-in-part of abandoned application Ser. No. 78,625, Oct. 6, 1970. This application Nov. 17, 1972, Ser. No. 307,461
Int. Cl. C07c 149/06
U.S. Cl. 260—609 R                    1 Claim

ABSTRACT OF THE DISCLOSURE

Thioacetic acid is added photochemically, or in presence of a hydroperoxide, to tetrallyl ether of pentaerythritol to prepare pentaerythritol tetrakis (3-thioacetoxy-propyl) ether, which is then hydrolyzed with sodium hydroxide solution to give a polythiol, tetrakis (3-mercaptopropyl) ether of pentaerythritol.

---

This is a continuation-in-part of my co-pending application Ser. No. 78,625, filed Oct. 6, 1970, now abandoned.

In the present invention, thioacetic acid is added photochemically or in the presence of hydroperoxide to tetrallyl ether of pentaerythritol:

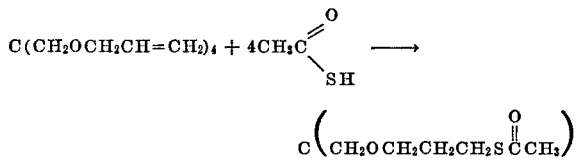

The addition product, pentaerythritol tetrakis (3-thioacetoxy-propyl) ether was hydrolyzed with a 25% solution of sodium hydroxide in water to obtain the desired product:

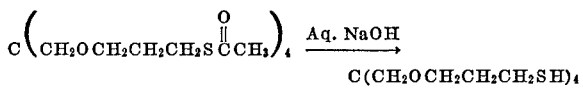

The polythiol compound is a colorless, high-boiling liquid (density, 1.214 g./ml., refractive index, $$n_D^{24} = 1.521).$$

The polythiol can be admixed with polyenes to make photopolymers. It can be used, for example, in the manner disclosed in French Pat. 1,591,116 and U.S. Pats. 3,535,193 and 3,661,744 for polythiols generally in their reaction with polyenes in the manufacture of polymers curable by ultraviolet light, for printing plates and the like, as taught in the said patents. Specific examples of such photopolymers are given in Examples 4 and 5 below.

EXAMPLE 1

Pentaerythritol tetrakis (3-thioacetoxy-propyl)ether

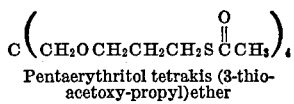
Pentaerythritol tetrakis (3-thio-acetoxy-propyl)ether

In a Pyrex tube (10″ long and 2″ wide) were placed a stirring bar magnet, 59.2 (0.2M) tetrallyl ether of pentaerythritol and 76.0 g. (1M) thioacetic acid. A low pressure mercury lamp enclosed in a quartz tube (about 1″ in diameter) was then immersed in the stirred mixture. The mixture was irradiated with this lamp for 2 hours, when a yellowish, viscous liquid material was obtained. Excess thioacetic acid was removed by distillation and the residue heated to 140° C. at 0.5 mm. of Hg. After cooling, the yellow liquid was decolorized with charcoal. The weight of the addition product was 102.7 g. (86% of theory).

EXAMPLE 2

Tetrakis (3-mercaptopropyl) ether of pentaerythritol $$C(CH_2OCH_2CH_2CH_2SH)_4$$

All of the liquid tetrakis thioacetate addition product of Example 1 was placed in a 1 liter, three neck, round bottom flask equipped with mechanical stirrer and reflux condenser. An aqueous solution of sodium hydroxide (60 g. in 180 ml. of $H_2O$) was added and the mixture heated with stirring for 5 hours. After cooling to room temperature, the reaction mixture was acidified with hydrochloric acid to pH 6–6.5 and extracted with 500 ml. of diethyl ether and the ether layer separated. Ether was removed by distillation and the residue (liquid) was heated to 125° C. at 0.5 mm. Hg to remove any volatile materials that might be present. The colorless liquid residue on cooling was weighed and stored under nitrogen. The yield was 68.5 g. (95% of theory).

EXAMPLE 3

In this example the teraester intermediate was made using a hydroperoxide catalyst rather than in accordance with the photochemical synthesis of Example 1.

In a three-necked 250 ml. round bottom flask equipped with a condenser, thermometer and addition funnel were placed 29.6 g. of tetrallyl ether of pentaerythritol and 0.5 ml. of t-butyl hydroperoxide. The mixture was stirred magnetically and heated to 40° C. Thioacetic acid was added dropwise until the temperature reached 80° C. At this point the rate of addition was adjusted to maintain a temperature of 80–85° C. Addition was completed in 45 minutes. (A total of 30.4 g.—0.4M—was added.) The reaction mixture was then heated at 90° C. for an additional 45 minutes and cooled to room temperature. It was next heated to 80° C. under vacuum to remove any volatile side products. The cooled reaction product was transferred to a tared flask and weighed. The yield of the tetraester was 58.6 g. (97.7 percent).

The thio-ester obtained was hydrolyzed in the same manner as described in Example 2.

EXAMPLE 4

1 mole of a commercially available poly(propylene ether) glycol having a molecular weight of about 1958 and hydroxyl number of 57.6 was charged to a resin kettle equipped with a condenser, stirrer, thermometer and a gas inlet and outlet. 4 g. of dibutyl tin dilaurate as a catalyst was added to the kettle along with 348 g. (2.0 moles) of tolylene-2,4-diisocyanate and 116 g. (2 moles) of allyl alcohol. The reaction was carried out for 20 minutes at room temperature under nitrogen. Excess alcohol was stripped from the reaction kettle by vacuum over a 1 hour period. The thus formed $CH_2=CH$— terminated liquid prepolymer had a molecular weight of approximately 2400.

EXAMPLE 5

0.01 mole of the allyl-terminated liquid prepolymer of Ex. 4 was charged to a 2 oz. glass dish along with a stoichiometric amount to react with the allyl groups, i.e. 0.005 moles, of pentaerythritol tetrakis (3-mercaptopropyl ether) from Example 2, and about 2% total weight of benzophenone. The liquid reactants were stirred together for a few minutes at room temperature. Thereafter the reactants were photo-exposed to type RS Sunlamp at a distance of 12 inches under ambient conditions of room temperature and pressure. After exposure for 5 minutes, the liquid reactants had become solid. A self-supporting, cured, essentially odorless, elastomeric polythioether product resulted.

What is claimed is:
1. Tetrakis (3-mercaptopropyl) ether of pentaerythritol, $C(CH_2OCH_2CH_2CH_2SH)_4$.

References Cited
UNITED STATES PATENTS

| | | | |
|---|---|---|---|
| 2,397,689 | 4/1946 | Paulic et al. | 260—609 R |
| 2,522,589 | 9/1950 | Vaughn et al. | 260—609 R |
| 3,270,063 | 8/1966 | Fath et al. | 260—609 R |

LEWIS, GOTTS, Primary Examiner

D. R. PHILLIPS, Assistant Examiner

U.S. Cl. X.R.

260—79.5, 455 R